United States Patent
Schick et al.

(10) Patent No.: US 6,371,459 B1
(45) Date of Patent: Apr. 16, 2002

(54) ACTIVE SUSPENSION WITH OFFLOAD ADJUSTMENT

(75) Inventors: Troy Eugene Schick, Cedar Falls; Daniel Lee Dufner, Waterloo, both of IA (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 09/654,792

(22) Filed: Sep. 5, 2000

(51) Int. Cl.⁷ ................................................ F16F 1/00
(52) U.S. Cl. ........................................................ 267/131
(58) Field of Search ................................ 267/131–133, 267/136, 142; 180/89.12, 89.13, 89.15; 280/5.5, 5.507, 5.515, 840; 901/37, 50

(56) References Cited

U.S. PATENT DOCUMENTS

| | | |
|---|---|---|
| 3,233,886 A | 2/1966 | Saffell et al. |
| 3,701,499 A | 10/1972 | Schubert et al. .......... 244/17.27 |
| 3,951,373 A | 4/1976 | Swenson et al. ............ 248/400 |
| 4,198,025 A | 4/1980 | Lowe et al. ................. 248/550 |
| 4,363,377 A | 12/1982 | Van Gerpen ................ 180/282 |
| 5,044,455 A | * 9/1991 | Tecco ...................... 180/89.13 |
| 5,941,920 A | 8/1999 | Schubert ....................... 701/37 |
| 6,000,703 A | 12/1999 | Schubert et al. .......... 280/5.518 |

OTHER PUBLICATIONS

Grimm, et al., An Active Seat Suspension System For Off–Road Vehicles, Div. of Control Engineering, U of Saskatchewan (date unknown).
McCormac et al., "Dual–Axis Active Seat Suspension System", ASAE Paper No. 89–7542, Dec. 1989.
Ho, et al., "Microprocessor Controlled Active Seat Suspension System For Off–Road Vehicles", National Conference on Fluid Power, 1984.

* cited by examiner

Primary Examiner—Robert J. Oberleitner
Assistant Examiner—C. T. Bartz

(57) ABSTRACT

An active suspension system for supporting a mass, such as a seat on a base of a vehicle includes a hydraulic actuator coupled between the seat and the base, an pneumatic off-load device between the seat and the base, and a control system which actively controls the hydraulic actuator and which controls the off-load member. The control system actively controls the hydraulic actuator as a function of a seat position error signal. The control system also controls the off-load member as a function of a signal used in the active control of the actuator. A compressor and a vent are coupled to the pneumatic device for controlling pressurization thereof. The control system comprises an electronic control unit which repeatedly executes a control algorithm at a predetermined rate, and which controls the operational status of the compressor and the vent as a function of the position error signal and the predetermined rate.

14 Claims, 4 Drawing Sheets

ACTIVE SUSPENSION WITH OFFLOAD ADJUSTMENT

BACKGROUND OF THE INVENTION

The invention relates to a suspension system, and more particularly, to an active seat suspension with a hydraulic actuator in parallel with a pneumatic air spring or air bag.

Passive suspension systems, such as for a vehicle seat, are known. For example, John Deere production 6000, 7000, 8000 and 9000 Series tractors have passive seat suspension systems which include a hydraulic shock absorber in parallel with an air bag. Active suspension systems are known which include an electro-hydraulically controlled actuator working in parallel with a resilient device, such as a spring. For example, U.S. Pat. No. 4,363,377 (Van Gerpen), issued Dec. 14, 1982, discloses an active seat suspension system with a hydraulic actuator in parallel with a spring. A control system controls fluid communication to the actuator in response to a seat position signal, a stiffness control, a seat height control and a gain control. U.S. Pat. No. 6,000,703 (Schubert et al.), issued Dec. 14, 1999, discloses an active cab or seat suspension control system with a hydraulic actuator in parallel with a pneumatic air spring or air bag. An active seat suspension system which actively controls the seat isolation with hydraulics and an accelerometer is shown in An Active Seat Suspension System For Off-Road Vehicles, by Grimm, et al. The function of the air bag is to take load off of ("offload") the hydraulic actuator by supporting the suspended mass. The hydraulic actuator is actively controlled to dynamically isolate the seat from the base upon which it is mounted. Such a system is desirable because, by having the static weight suspended by an air bag, the forces and pressures on the actuator and its hydraulic system are reduced, thus reducing the overall power required for active control and isolation. When the air bag "offloads" the hydraulic actuator during static conditions, the forces required from the hydraulic actuator would essentially be zero.

Typically, in such systems, the suspended mass of the system changes due to changes in operator weight, or changes in vehicle ballast. Weight changes effect the equilibrium position of the suspension, and in an active suspension with offload and closed loop position control, it is desirable to maintain the control position set point at the equilibrium position of the suspension. Therefore, it is desirable to have a control system which automatically adjusts the offload equilibrium position (via and air bag) to match a control position set point, or to adjust the control position set point to match the offload equilibrium position. In a system with an air offload device, such as a compressible air spring or air bag, the offload force which effects the equilibrium position can be adjusted by increasing or decreasing the amount of air in the air spring using an electro-pneumatic compressor and an electronic vent valve. Whether or not the offload force or position set point must be adjusted can be determined by sensing the hydraulic pressure in the actuator. But, using pressure sensors can be expensive and complicated. Accordingly, it would be desirable to have a means for adjusting the offload or position setpoint which does not require pressure sensors.

SUMMARY OF THE INVENTION

Accordingly, an object of this invention is to provide an active suspension system with an actively controlled actuator and an offload device, wherein the offload and/or position setpoint can be adjusted without pressure sensors.

This and other objects are achieved by the present invention, wherein an active suspension system for supporting a mass, such as a seat on base of a vehicle, includes a hydraulic actuator coupled between the seat and the base, an pneumatic off-load device between the seat and the base, and a control system which actively controls the hydraulic actuator and which controls the off-load member. The control system actively controls the hydraulic actuator as a function of a seat position error signal, and the seat acceleration signal. The control system also controls the off-load member as a function of the seat position error signal. A compressor and a vent are coupled to the pneumatic device for controlling pressurization thereof. The control system comprises an electronic control unit which repeatedly executes a control algorithm at a predetermined rate, and which controls the operational status of the compressor and the vent as a function of the position error signal and the predetermined rate.

DETAILED DESCRIPTION

Figure 1:
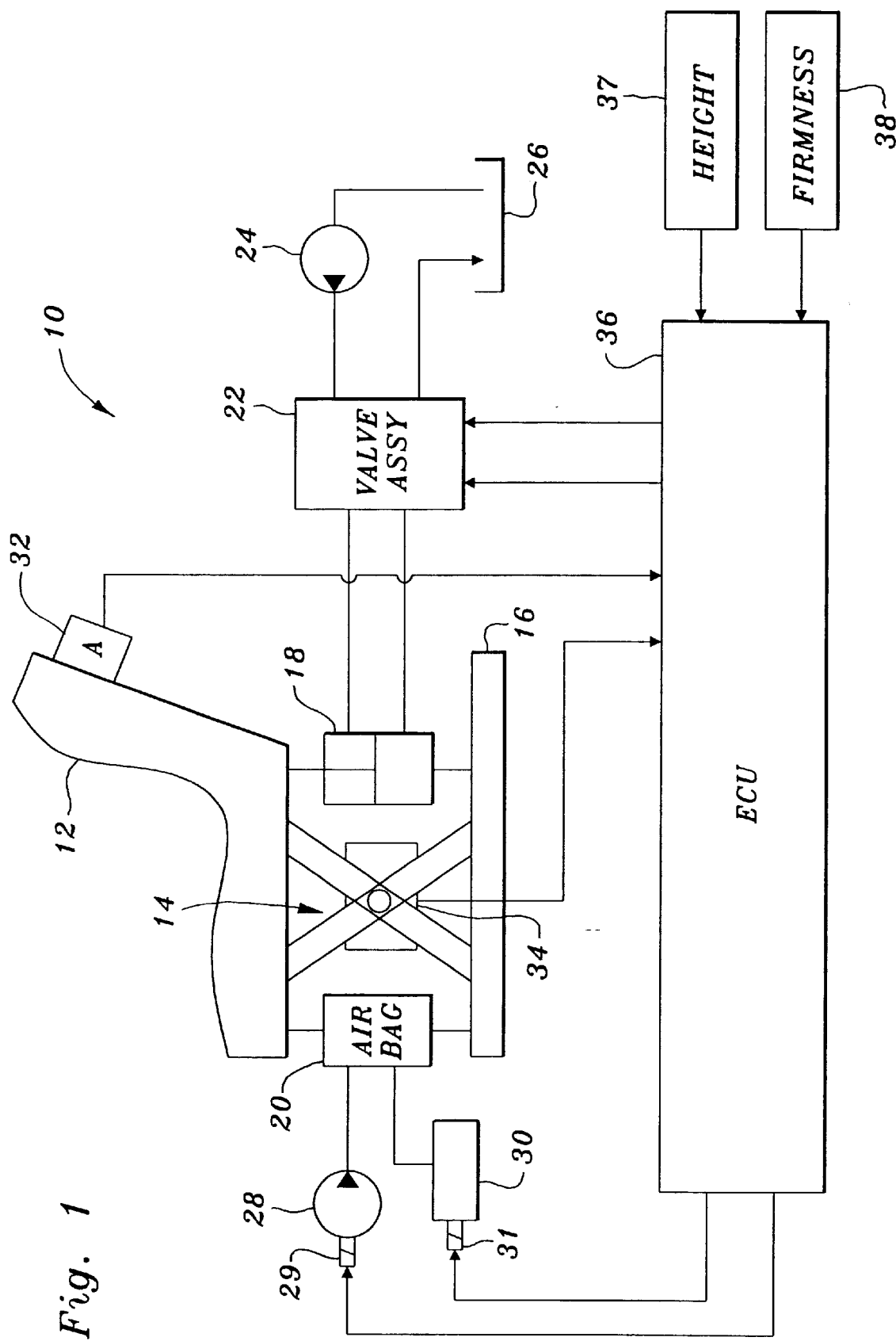
FIG. 1 is a simplified schematic diagram of a seat suspension system according to the present invention.

Referring to FIG. 1, an active seat suspension system 10 includes a seat 12 supported by scissors linkage 14 above a seat base 16. Also coupled between the seat 12 and the base 16 are a hydraulic piston or actuator 18 and a pneumatic device, such as an airbag 20. A hydraulic circuit or valve unit 22 controls fluid communication between the actuator 18, a pump 24 and a reservoir or sump 26. The amount of air in the airbag 20 is controlled by compressor 28 (controlled by solenoid 29) and by vent 30 (controlled by solenoid 31). An accelerometer 32, such as a commercially available silicon capacitive variation transducer, is attached to the seat 12, and a seat position sensor 34, such as a ratio-metric, rotary Hall-effect transducer, is coupled to the linkage 14. An electronic control unit (ECU) 36 receives signals from sensors 32 and 34, from a manually operable height control 37 and from a manually operable firmness control 38. In response to these inputs, the ECU 36 provides control signals to the valve unit 22, the compressor control solenoid and a vent control solenoid.

Figure 2:
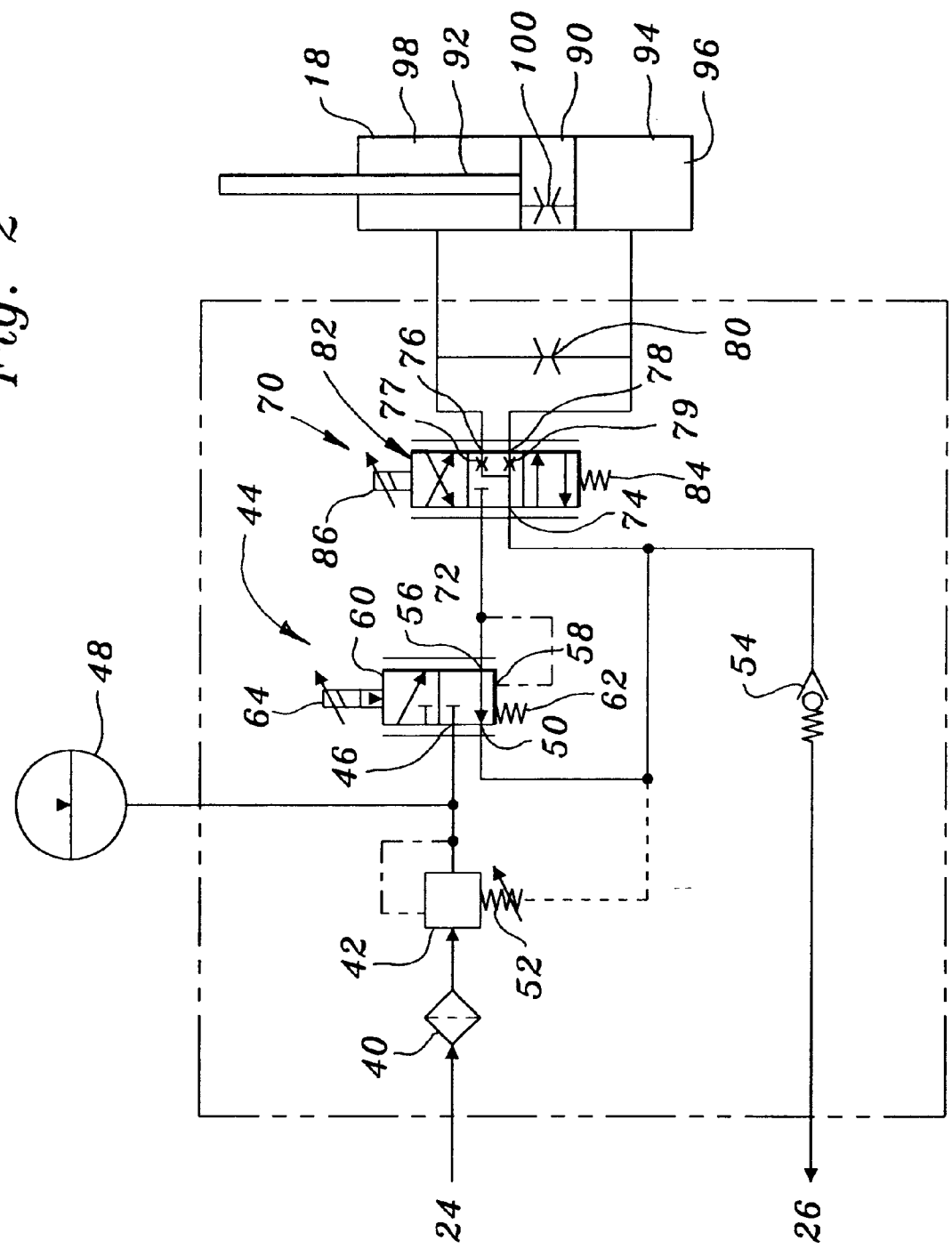
FIG. 2 is a schematic diagram of the hydraulic valve circuit portion of FIG. 1.

As best seen in FIG. 2, the valve unit 22 includes in inlet screen 40 coupled between the pump 24 and a pressure reducing valve 42. A solenoid operated, 2-position, proportional pressure control valve 44 includes a first port 46, a second port 50 and a third port 56. First port 46 is communicated with an outlet of the pressure reducing valve 42 and with an accumulator 48. Second port 50 is communicated with a pressure control inlet 52 of pressure reducing valve 42, and with sump 26 via a return check valve 54 and a filter (not shown). Third port 56 is communicated with a pressure sensing port 58 of valve 44 and with a proportional flow control valve 70. Valve 44 includes a valve member 60 movable from a first position wherein port 46 is closed and port 50 is communicated to port 56, to a second position wherein port 50 is closed and port 46 is communicated with port 56. A spring 62 urges valve member 60 into its first position. Solenoid 64 may be energized to move valve member 60 into its second position.

Proportional flow control valve 70 includes a first port 72, a second port 74, a third port 76 and a fourth port 78. Port 72 is communicated with the third port 56 of valve 44. Port 74 is communicated with port 50 of valve 44, and with sump 26 via a return check valve 54. Port 76 is communicated with a first port of actuator 18. Port 78 is communicated with a second port of actuator 18. An orifice 80 communicates port 76 with port 78. Valve 70 includes a valve member 82 movable from a first position (actuator extension) wherein port 72 is communicated to port 76 and port 78 is communicated with port 74, to a second, center or "float" position wherein port 72 is blocked and ports 76 and 78 are communicated to port 74, and to a third position (actuator retraction) wherein port 72 is communicated to port 78 and port 74 is communicated with port 76. A spring 84 urges valve member 82 into its first position. Solenoid 86 may be energized to move valve member 82 into its second and third positions.

Actuator 18 includes a piston 90 and rod 92 movable within a cylinder 94 and which separates the cylinder into chambers 96 and 98. An orifice passage 100 extends through piston 90 and communicates chamber 96 with chamber 98.

The circuit 22 is further described in co-pending application Ser. No. 09/654,793, which is incorporated by reference herein.

Figure 3:
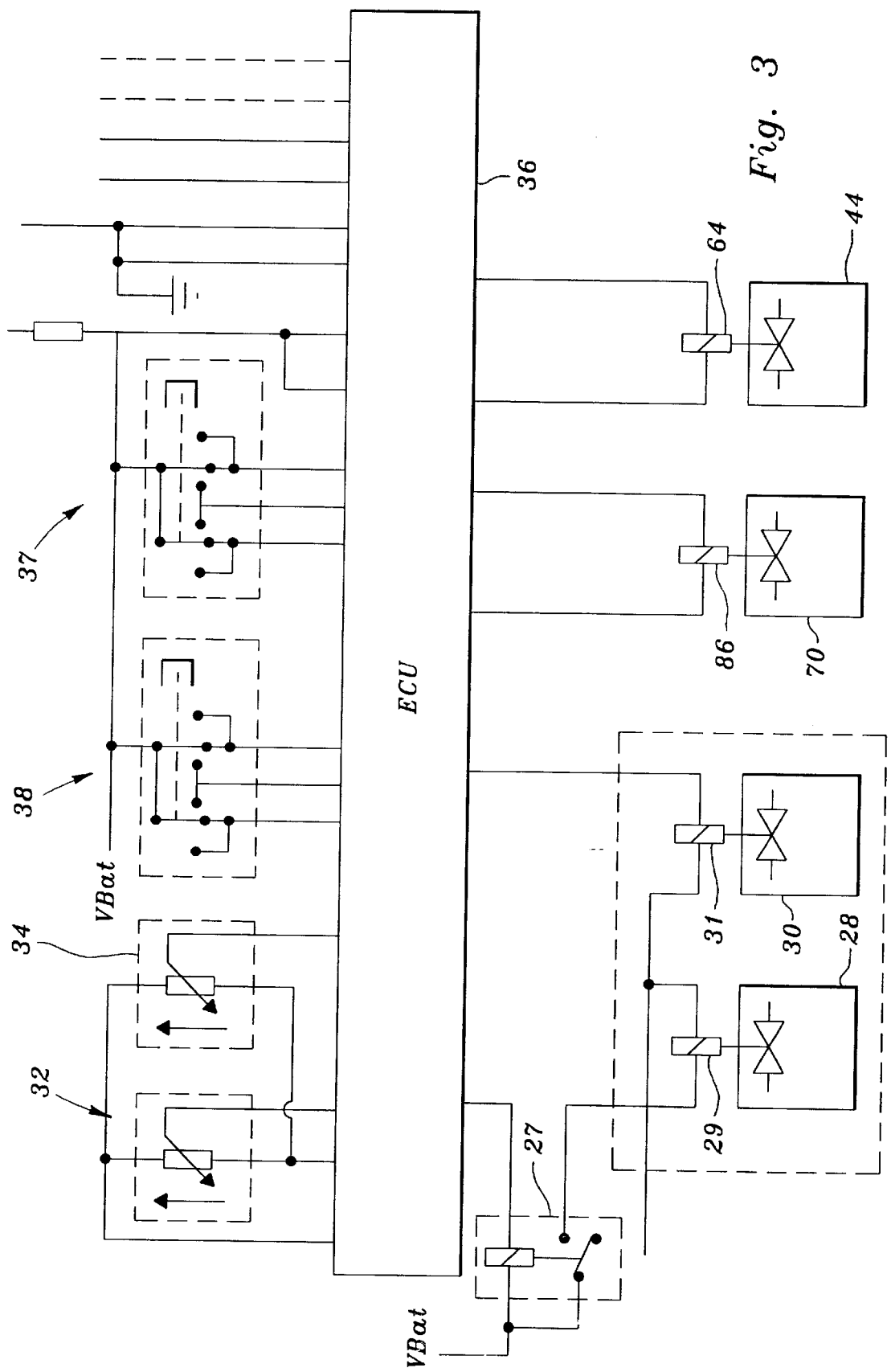
FIG. 3 is an electrical schematic diagram of a of the present invention.

As best seen in FIG. 3, the ECU 36 is connected to the accelerometer 32, the seat position sensor 34, height control 37, firmness control 38, solenoid 64 of valve 44, solenoid 86 of valve 70, compressor relay 27, solenoid 29 of compressor 28 and solenoid 31 of vent 30. The ECU is preferably programmed for offload control as described below, and as illustrated by the control system block diagram of FIG. 4.

Figure 4:
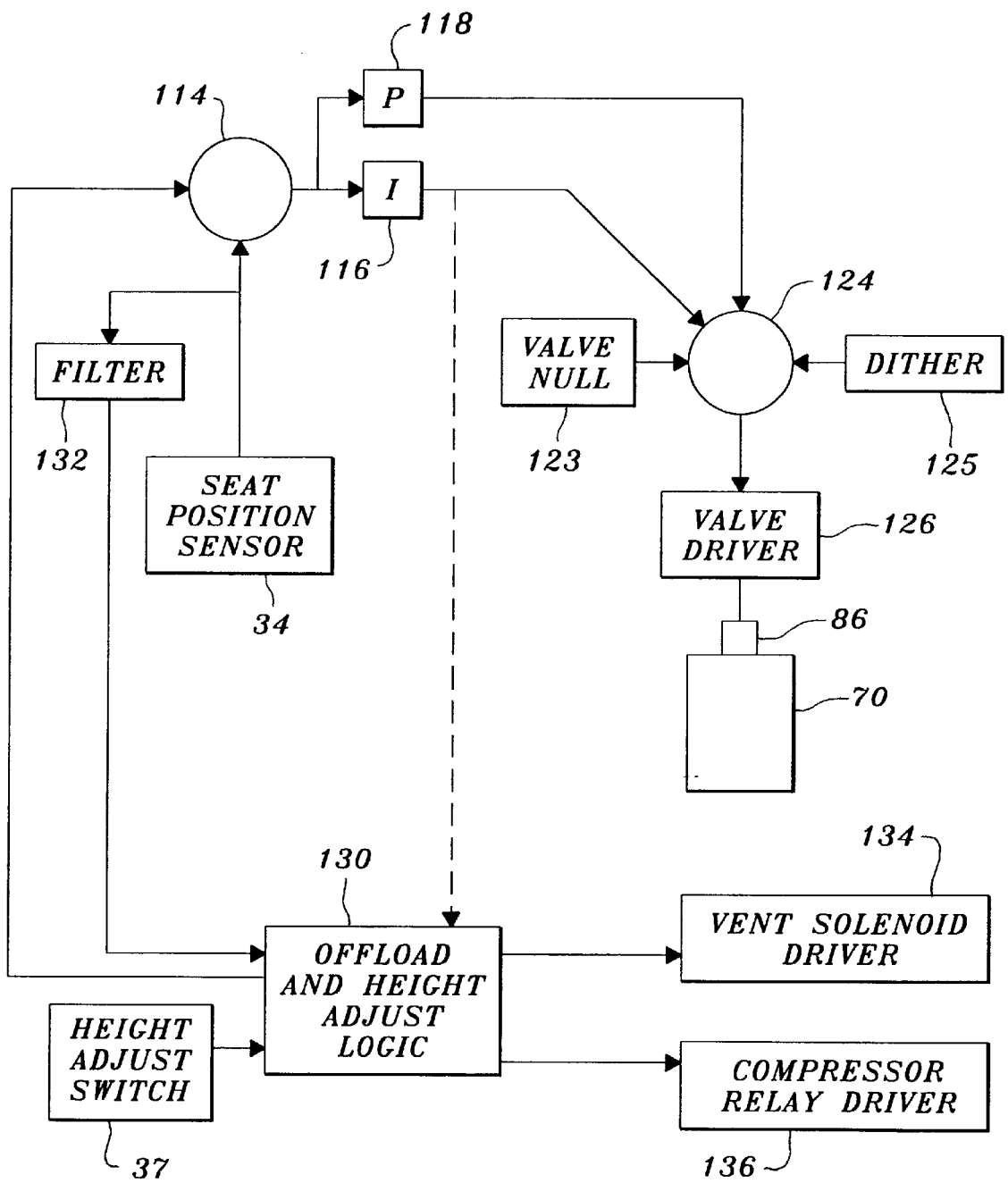
FIG. 4 is a control system block diagram which illustrates the present invention.

Referring now to FIG. 4, the signal from seat position sensor 34 and a reference seat height signal are applied to a difference unit 114, which generates a seat position error signal, which is integrated by an integrator 116 and multiplied by a gain value by a proportional unit 118. The reference seat height signal is a stored value from the seat position sensor 34 provided by offload and height adjust logic unit 130. The signals from units 116 and 118 are summed by summing unit 124 along with a valve null signal from null unit 123 and a dither signal from dither unit 125. The signal from unit 124 is applied to a valve driver 126 which drives the solenoid 86 of flow control valve 70. Logic unit 130 also controls a solenoid driver 134 for solenoid 31 of vent 30, and controls a driver 136 for compressor relay 27 which controls solenoid 29 of compressor 28. Logic unit 130 receives the integrated position error signal from integrator 116, receives a filtered position signal (which represents the equilibrium position) from filter 132, receives a height adjust signal from height adjust control 37, generates the reference seat height signal, generates a control signal for a solenoid driver 134 for the vent solenoid 31, and generates a control signal for a relay driver 136 for the compressor control solenoid relay 27. The offload equilibrium position is defined as the seat position when the hydraulic actuator 18 is in a float condition.

Thus, the control system of FIG. 4 actively controls the hydraulic actuator 18 as a function of a plurality of control signals, including an integrated position error signal from integrator 116. This control system also controls the off-load member or air bag 20 as a function of the integrated position error signal from integrator 116.

The system includes an operational mode wherein it adjusts the control position set point and the offload of the airbag 20 to a desired position. In this mode, the ECU 36 program prevents the operator from adjusting the seat height to a level which is outside of a certain range or "ride zone". The ride zone is defined by a Ride-Zone-Upper-Limit and a Ride-Zone-Lower-Limit, as follows:

Ride-Zone-Upper-Limit=Max_Raised_SeatPosition+Upper_Limit Offset,

Ride-Zone-Lower-Limit=Max_Lowered_SeatPosition−Lower_Limit Offset.

The ECU 36 will execute a seat height raise sequence when a "raise" input is received from the raise/lower rocker switch 37. When the raise input is active the ECU 36 will turn on the pressure control valve 44, the flow control valve 70, and the air compressor 28. As long as the rocker switch 37 is depressed in the up or "raise" position, the ECU 36 will increment the control position setpoint (New Ref value at a defined rate. The ECU 36 will stop incrementing New-Ref value when the switch 37 is released or the calculated filtered valve command reaches an upper command limit. When the rocker switch 37 is released or the Ride_Zone_Upper_Limit is reached, the ECU will store the current filtered seat position (Stored-Ref). The ECU 36 will then decrement New_Ref value while the compressor is kept on, as per the following equation:

New-Ref=New-Ref+(Stored-Ref−Current Filtered_Seat Position)/Decrement Gain.

When New-Ref is greater than or equal to Stored-Ref, the ECU 36 will not decrement the control position setpoint value any further, and will shut off the compressor 28, pressure control valve 44, and flow control valve 70.

Alternatively, a raise can be accomplished without the use of pressure control valve 44 and flow control valve 70, by simply turning on the compressor 28. In this case, the compressor 28 is kept on as long as the rocker switch 37 is depressed in the raise position. When the switch 37 is released within the ride zone limits, the ECU 36 will record the current seat position as the reference height.

The ECU 36 will execute a seat lower sequence when a "lower" command is received from the raise/lower rocker switch 37, whereupon the ECU 36 will turn off the pressure control valve 44 and flow control valve 70, and turn on the vent solenoid 31. As long as the switch 37 is in its "lower" position, the ECU 36 will keep the vent solenoid 31 on. When the switch 37 is released or the Ride-Zone_Lower-Limit is reached, the ECU 36 will store the current filtered seat position from filter 132 as the new control position setpoint and turn off the vent solenoid 31.

When the vehicle starts moving, the current seat position is used as the control position setpoint. If the control position setpoint is greater than Ride-Zone-Upper-Limit, the ECU 36 will execute an automatic lower sequence until the seat position drops below Ride-Zone-Upper-Limit. Alternatively, if the control position setpoint is below Ride-Zone-Lower-Limit, the ECU 36 will execute an automatic raise sequence until the seat position rises above Ride-Zone-Lower-Limit.

The system also includes an operational mode wherein it adjusts offload via the airbag 20 to a desired position. In this mode, the ECU 36 also preferably executes automatic offload control logic in parallel with active isolation. As illustrated by FIG. 4, during automatic offload control, commands to the vent 30 and compressor 28 are based on the output of the position error integrator 116. The ECU 36 repeatedly reads the output of the integrator 116 output every Delay-Time period, such as 60 seconds, and then determines if the offload requires adjustment. When the output of integrator 116 is greater than an Offload Int_ Upper value, the ECU 36 will turn the vent 30 on for a duration calculated by this equation:

Vent_On_Time=Integrator_Output/(Vent_Gain×Update_Rate), where Vent_Gain is a stored initialized value in units of command count per second, and Update_rate is the repetition rate of the microprocessor (not shown), such as 10 milliseconds.

If the output of the integrator 116 is less than a lower limit value, then the compressor 28 will be turned on for a duration determined by this equation:

Compressor_On_Time=Integrator_Output/(Compressor_Gain× Update_Rate), where Compressor_Gain is a stored initialized value in units of command count per second. The ECU 36 also resets the total output of integrator 116 when the vent or compressor output transitions from on to off. Thus, the compressor 28 and the vent 30 are controlled as a function of the position error signal which is used primarily to control the actuator 18 during active control of the actuator 18.

The ECU 36 achieves integral control by calculating a running sum of the position error which is scaled by the sample rate (Backward Euler). The ECU 36 stops adding to the output of the integrator 116 when the output exceeds a +Int Limit value. The ECU 36 stops subtracting from the output of the integrator 116 when the output drops below a −Int Limit value. Also, the ECU will not add or subtract from the running sum unless the position error from difference unit 114 exceeds a +/−Integral-Deadband range.

The system also includes an operational mode wherein it adjusts the control position set point to the offload equilibrium position. In this mode, the ECU 36 can use logic where the control position set point is adjusted to the offload equilibrium position. The ECU 36 also preferably executes automatic set point control logic in parallel with active isolation. It should be noted that this logic does not use an integrator on the position error, and no commands are sent to the vent or the compressor. During automatic set point control, the seat reference height is adjusted to the equilibrium/offloaded position of the seat. The seat logic shall look at the seat equilibrium position every Delay_ Time seconds, and determine if the seat reference height requires adjustment. The seat logic will calculate the seat reference height error using the following equation.

Seat_Ref_Error=Stored_Ref−Filtered_Seat_Position

When the Seat_Ref_Error is less than −Error_Limit or greater than +Error_Limit, the seat logic will calculate a new seat reference height using the following equation.

Stored_Ref (new)=Stored_Ref (old)−Seat_Ref_Error*Ref_Error_Gain

The system also includes an operational mode wherein the ECU 36 enables manual offload control when a fault condition exists. During manual control, commands to the vent 30 and compressor 28 are based only on the status of the seat raise/lower rocker switch 37.

It should be noted that the flow through passages 100 and 80 is proportional to the differential pressure between chambers 96 and 98 in actuator 18, and is proportional to the effective load on the actuator 18. Also, valve current to solenoid 86 of flow control valve 70 is proportional to this flow, so that the command to valve 70 is proportional to the net load on the actuator 18. Since the position error signal is proportional to the valve command, by monitoring and averaging (integrating) this position error signal over time, a valve command bias can be determined and the offload system can be adjusted accordingly. Alternatively, by monitoring the position error only (no integration) the control position set point can adjusted to the equilibrium position of the suspension. In a true offloaded condition, the valve bias for a null valve command would be zero resulting in a position error of zero. Thus, the passages 100 and 80 are required for this type of offload control While the present invention has been described in conjunction with a specific embodiment, it is understood that many alternatives, modifications and variations will be apparent to those skilled in the art in light of the foregoing description. For example, the present invention is applicable to suspension systems for masses other than seats, such a vehicle cab or chassis. Accordingly, this invention is intended to embrace all such alternatives, modifications and variations which fall within the spirit and scope of the appended claims.

What is claimed is:

1. A suspension system adapted to be coupled between a mass on a base of a vehicle, the suspension system comprising:
   a hydraulic actuator adapted to be coupled between the mass and the base;
   an off-load member adapted to be coupled between the mass and the base; and
   a control system which actively controls the hydraulic actuator as function of a plurality of signals and which controls the off-load member as a function of one of said plurality of signals.

2. The suspension system of claim 1, wherein:
   the control system generates a position error signal as a function of a mass position signal and a reference mass position signal, said position error signal being used in the active control of the actuator, and the control system controlling the off-load member at least partially as a function of the position error signal.

3. The suspension system of claim 1, further comprising:
   at least one orifice coupled to the hydraulic actuator so that hydraulic fluid will flow through the orifice as the hydraulic actuator moves under a load.

4. The suspension system of claim 1, wherein:
   the off-load member is a pneumatic device; and
   a compressor and a vent control pressurization of the pneumatic device, the control system controlling an operational status of the compressor and the vent as a function of the control signal used in the active control of the actuator.

5. The suspension system of claim 1, wherein:
   the off-load member is a pneumatic device;
   a compressor and a vent are coupled to the pneumatic device for controlling pressurization thereof; and
   the control system generates a position error signal as a function of a mass position signal and a reference mass position signal, and the control system controlling an operational status of the compressor and the vent as a function of a control signal derived from the position error signal.

6. The suspension system of claim 1, wherein:
   the off-load member is a pneumatic device;
   a compressor and a vent are coupled to the pneumatic device for controlling pressurization thereof; and the control system comprises an electronic control unit which repeatedly executes a control algorithm at a predetermined rate, the control system generating a position error signal as a function of a mass position signal and a reference mass position signal, and controlling an operational status of the compressor and the vent as a function of a control signal derived from the position error signal and as a function of said predetermined rate.

7. The suspension system of claim 6, wherein:
the control system turns the compressor on for a period of time proportional to a magnitude of the position error signal divided by said predetermined rate.

8. The suspension system of claim 6, wherein:
the control system turns the vent on for a period of time proportional to a magnitude of the position error signal divided by said predetermined rate.

9. The suspension system of claim 3, wherein:
the control system actively controls the hydraulic actuator in response to movement of the hydraulic actuator.

10. A suspension system adapted to be coupled between a mass on a base of a vehicle, the suspension system comprising:
a hydraulic actuator adapted to be coupled between the mass and the base;
an off-load member adapted to be coupled between the mass and the base; and
a control system which actively controls the hydraulic actuator as function of a plurality of signals and which controls the off-load member as a function of one of said plurality of signals, the control system generating an integrated position error signal as a function of a mass position signal and a reference mass position signal, said integrated position error signal being used in the active control of the actuator, and the control system controlling the off-load member as a function of the integrated position error signal.

11. A suspension system adapted to be coupled between a mass on a base of a vehicle, the suspension system comprising:
a hydraulic actuator adapted to be coupled between the mass and the base;
an off-load member adapted to be coupled between the mass and the base, the off-load member comprising a pneumatic device;
a compressor and a vent adapted to be coupled to the pneumatic device for controlling pressurization thereof; and
a control system which actively controls the hydraulic actuator as function of a plurality of signals and which controls the off-load member as a function of one of said plurality of signals, the control system comprising an electronic control unit which repeatedly executes a control algorithm at a predetermined rate, the control system generating a position error signal as a function of a mass position signal and a reference mass position signal, and controlling an operational status of the compressor and the vent as a function of a control signal derived from the position error signal and as a function of said predetermined rate, and when the position error signal magnitude is less than a lower limit value, the control system turning the compressor on for a period of time proportional to a magnitude of the position error signal divided by said predetermined rate.

12. A suspension system adapted to be coupled between a mass on a base of a vehicle, the suspension system comprising:
a hydraulic actuator adapted to be coupled between the mass and the base;
an off-load member adapted to be coupled between the mass and the base, the off-load member comprising a pneumatic device;
a compressor and a vent adapted to be coupled to the pneumatic device for controlling pressurization thereof; and
a control system which actively controls the hydraulic actuator as function of a plurality of signals and which controls the off-load member as a function of one of said plurality of signals, the control system comprising an electronic control unit which repeatedly executes a control algorithm at a predetermined rate, the control system generating a position error signal as a function of a mass position signal and a reference mass position signal, and controlling an operational status of the compressor and the vent as a function of a control signal derived from the position error signal and as a function of said predetermined rate, and when the position error signal magnitude is less than a lower limit value, the control system turning the compressor on and pressurizing the hydraulic actuator for a period of time proportional to a magnitude of the position error signal divided by said predetermined rate.

13. A suspension system adapted to be coupled between a mass on a base of a vehicle, the suspension system comprising:
a hydraulic actuator adapted to be coupled between the mass and the base;
an off-load member adapted to be coupled between the mass and the base, the off-load member comprising a pneumatic device;
a compressor and a vent adapted to be coupled to the pneumatic device for controlling pressurization thereof; and
a control system which actively controls the hydraulic actuator as function of a plurality of signals and which controls the off-load member as a function of one of said plurality of signals, the control system comprising an electronic control unit which repeatedly executes a control algorithm at a predetermined rate, the control system generating a position error signal as a function of a mass position signal and a reference mass position signal, and controlling an operational status of the compressor and the vent as a function of a control signal derived from the position error signal and as a function of said predetermined rate, and when the position error signal magnitude is greater than an upper limit value, the control system turning the vent on for a period of time proportional to a magnitude of the position error signal divided by said predetermined rate.

14. A suspension system adapted to be coupled between a mass on a base of a vehicle, the suspension system comprising:
a hydraulic actuator adapted to be coupled between the mass and the base;
an off-load member adapted to be coupled between the mass and the base, the off-load member comprising a pneumatic device;
a compressor and a vent adapted to be coupled to the pneumatic device for controlling pressurization thereof; and a control system which actively controls the hydraulic actuator as function of a plurality of signals and which controls the off-load member as a function of one of said plurality of signals, the control system comprising an electronic control unit which repeatedly executes a control algorithm at a predetermined rate, the control system generating a position error signal as a function of a mass position signal and a reference mass position signal, and controlling an operational status of the compressor and the vent as a function of a control signal derived from the position error signal and as a function of said predetermined rate, the mass being in an offload equilibrium position when the hydraulic actuator is in a float condition, the control system controls the position of the hydraulic actuator as a function of a control position set point, and the control system adjusting the control position set point to match the offload equilibrium position.

* * * * *